(12) United States Patent
Meyrahn et al.

(10) Patent No.: US 9,285,210 B2
(45) Date of Patent: Mar. 15, 2016

(54) METHOD FOR MEASURING A STORAGE FRAME

(75) Inventors: Joachim Meyrahn, Erzhausen (DE); Frank Niedecker, Porza (CH)

(73) Assignee: Poly-clip System GmbH & Co. KG, Hattersheim (DE)

( * ) Notice: Subject to any disclaimer, the term of this patent is extended or adjusted under 35 U.S.C. 154(b) by 351 days.

(21) Appl. No.: 13/021,684

(22) Filed: Feb. 4, 2011

(65) Prior Publication Data

US 2011/0196649 A1    Aug. 11, 2011

(30) Foreign Application Priority Data

Feb. 5, 2010    (EP) .................................... 10001218

(51) Int. Cl.
*G01B 7/00*    (2006.01)
*G01B 11/06*   (2006.01)
*A22C 15/00*   (2006.01)
*G01B 11/24*   (2006.01)

(52) U.S. Cl.
CPC ............ *G01B 11/0608* (2013.01); *A22C 15/00* (2013.01); *G01B 11/24* (2013.01)

(58) Field of Classification Search
CPC ................. A22C 15/007; A22C 11/00; B65G 2201/0202; G01B 11/2522
USPC .......... 702/155, 156, 166, 167; 356/601, 625, 356/627, 634
See application file for complete search history.

(56) References Cited

U.S. PATENT DOCUMENTS

| 5,106,259 | A | 4/1992 | Anderson et al. |
| 5,307,294 | A | 4/1994 | Aman et al. |
| 5,764,785 | A | 6/1998 | Jones et al. |
| 6,918,772 | B2 * | 7/2005 | Clark et al. .................. 434/322 |

(Continued)

FOREIGN PATENT DOCUMENTS

| DE | 10 2005 002 190 A1 | 7/2006 |
| DE | 10 2007 034 168 A1 | 2/2009 |
| EP | 1 243 892 A2 | 9/2002 |
| EP | 2 019 283 A2 | 1/2009 |
| GB | 1 416 568 | 12/1975 |

OTHER PUBLICATIONS

EP10001218.6-2213 Extended European Search Report dated Jun. 4, 2010, 6 pgs.

(Continued)

*Primary Examiner* — Sujoy Kundu
*Assistant Examiner* — Ricky Ngon
(74) *Attorney, Agent, or Firm* — Fitch, Even, Tabin & Flannery LLP

(57) ABSTRACT

The present invention relates to method for measuring a storage frame having at least one tray defining an at least one approximately horizontal storing plane and being used for storing rod-like elements, the rod-like elements serving for storing products, each having a sausage-shaped body and a loop for a pendulously storage of the products on a rod-like element. The method comprising the steps of moving the storage frame into the operating range of a measuring apparatus, scanning the storage frame by the measuring apparatus for detecting and recording data regarding geometrical dimensions of the storage frame including at least the height of the tray. The method further comprises the steps of referring the height of the tray to a reference height, creating a dataset including at least said height, storing the dataset in a data memory device, and creating a link between the dataset and the respective storage frame.

11 Claims, 2 Drawing Sheets

(56) References Cited

U.S. PATENT DOCUMENTS

| | | | |
|---|---|---|---|
| 7,221,998 B2 * | 5/2007 | Brust et al. | 700/245 |
| 7,357,953 B1 * | 4/2008 | Van Den Dungen et al. | 426/465 |
| 7,469,834 B2 | 12/2008 | Schelinski et al. | |
| 7,527,205 B2 * | 5/2009 | Zhu et al. | 235/462.14 |
| 7,684,052 B2 * | 3/2010 | Suwa et al. | 356/601 |
| 7,711,180 B2 * | 5/2010 | Ito et al. | 382/154 |
| 2006/0158662 A1 | 7/2006 | Schelinski et al. | |
| 2008/0143997 A1 | 6/2008 | Greenberg et al. | |
| 2009/0063093 A1 | 3/2009 | Prams et al. | |

OTHER PUBLICATIONS

DE 10 2005 002 190 A1—English abstract and machine translation obtained from Espacenet (http://worldwide.espacenet.com) on Apr. 23, 2012, 13 pages.

EP 2 019 283 A2—English abstract and machine translation obtained from Espacenet (http://worldwide.espacenet.com) on Apr. 23, 2012, 9 pages.

DE 10 2007 034 168 A1—English abstract obtained from Espacenet (http://worldwide.espacenet.com) on Apr. 23, 2012, 2 pages.

* cited by examiner

METHOD FOR MEASURING A STORAGE FRAME

This application claims priority to, and the benefit of, European Patent Application No. 10 001 218.6-2213, filed Feb. 5, 2010, which is hereby incorporated by reference.

BACKGROUND OF THE INVENTION

The present invention relates to a method for measuring a storage frame according to claim 1.

Methods for measuring objects, in particular geometric dimensions of said objects are already known. For example, in the production of machine parts or the like, these parts are disposed on a separate place and are measured for inspecting its geometric dimensions and for detecting possible deviations from predetermined reference values. Thereby, the machine part can be measured by a scanner or probe and the measured data or dimensions are compared to the respective reference values. In case that the measuring device is a coordinate measuring machine, the measured dimensions may be transferred into coordinate data to be compared with reference coordinate data. A respective measuring method is known from the German laid open document 10 2007 034 168. Furthermore, a scanner for detecting the tridimensional structure of a surface and a method for using said scanner are known from German patent 10 2005 002 190. The reflections of light emitted by a light source to a surface of the object to be measured are received by a detector. The detector outputs a signal from which the distance of the lighted point may be derived.

In the production of sausage-shaped products, there is a great variety of machines being components of respective production lines. These machines may vary in size, in rate of production and/or in size of products. Thus, they also may vary in the kind of used rod-like elements, on which the sausage-shaped products are to be stored and in the kind of storage frames, to which the rod-like elements are to be fed or from which they have to be removed. Even if identical rod-like elements are used, depending on the kind of sausage-shaped products and their further treatment, like smoking or boiling for sausages as sausage-shaped products, the rod-like elements together with the sausage-shaped products hanging thereon, have to be placed at specific positions inside a storage frame. Moreover, there is also a great variety of storage frames used. Said storage frames may be standardized, but they may also be individual produced.

According to the manufacturer, the storage frame may vary in size regarding the above-mentioned dimensions and/or in the diameter of the wheels used. Moreover, in use, storage frames may be damaged, individually adapted or repaired. Thus, the trays on which the rod-like elements are to be placed may be modified and their position may be changed.

While inserting a rod-like element together with the sausage-shaped products hanging thereon into a storage frame, in particular by a robotic device, said rod-like element may butt against the storage frame since, for example, the size of said storage frame has been modified due to adaption, repair or damage. As a result thereof, the sausage-shaped products may fall off the smoking rod or may be destroyed.

To avoid the above described disadvantages, only one specific kind of storage frame is usable in conjunction with the robotic device. Moreover, to restore the exact dimensions of said storage frame by e.g. repairing, a damaged storage frame is very expensive.

BRIEF SUMMARY OF THE INVENTION

Therefore, it is an object of the present invention to provide a method for measuring a storage frame, with which the above mentioned drawbacks can be overcome and with which a correct insertion and removal of rod-like elements into or from storage frame free of damages is assured.

The aforesaid object is achieved by the features of claim 1. Advantageous configurations of the inventive the method are described in claims 2 to 11.

In the present invention, the method for measuring a storage frame having at least one tray defining an at least one approximately horizontal storing plane and being used for storing rod-like elements, like smoking bars, wherein the rod-like elements serving for storing products, like sausages, each having a sausage-shaped body and a loop for a pendulously storage of the products on a rod-like element, comprises the steps of moving the storage frame into the operating range of a measuring apparatus, scanning the storage frame by the measuring apparatus for detecting and recording data regarding geometrical dimensions of the storage frame including at least the height of the tray, creating a dataset including the recorded data and storing the dataset in a data memory device.

In one embodiment of the present invention, the method for measuring a storage frame further includes referring the height of the tray to a reference height, creating a dataset including at least said height, storing the dataset in a data memory device and creating a link between the dataset and the respective storage frame. Accordingly, said dataset includes an information for allowing an exact placing of the smoking bar on the tray. Moreover by creating a link between the dataset and the respective storage frame, a robotic device to be controlled may receive the correct data while inserting or removing the smoking bars into or from said storage frame. The reference height may be the bottom level of the measuring apparatus or a mark at the storage frame having a predefined height to a reference point of the storage frame, e.g. the lowest or highest point of the storage frame.

According to an aspect of the present invention, it is possible to detect and record further outer dimensions of the storage device, like the size, the vertical heights or the distance of trays. By detecting and recording the further outer dimensions of the storage frame, collisions of the storage frame with elements of the production line and the like may be avoided.

The data recorded by the inventive measuring device may be of different structures. In an advantageous embodiment, said data include coordinates, like Cartesian coordinates, polar or spherical coordinates.

Various devices for scanning the storage frame may be used. Accordingly, the measuring apparatus may be a camera or a laser device. Moreover, to enhance to precision of the scanned data, the measuring apparatus may include more than one measuring device, e.g. a first and a second camera or laser, which are positioned to scan the storage frame from different directions.

To identify preferred geometric features of the storage frame or to limit the amount of data recorded while scanning, the storage frame may be provided with markers which mark the dimensions of the storage frame to be included in the dataset, and which are detected and recorded by the measuring apparatus.

Alternatively, two, some or all dimensions of the storage frame may automatically detected and recorded and afterward, the preferred dimension may manually be select and included in the dataset.

In an advantageous embodiment of the present invention, classes of datasets may be provided and the datasets may be arranged in said classes. A class of datasets may include datasets having similar features, e.g. similar geometrical dimensions which allow a robotic device to be controlled by the same program.

In the case that the geometrical dimensions of a storage frame have been changed due to a repair of said storage frame or other cases causing a change of said geometrical dimensions, a dataset may be reclassified after remeasuring the storage frame. That means that the new actual dataset has been shifted into the respective other class used for controlling the robotic device to be controlled by the respective other program.

For handling the storage frames, e.g. while storing sausage-shaped products or removing the stored products, the datasets are transmitted to a respective handling system including a robotic device for inserting or removing rod-like elements, like smoking bars, into or from a storage frame. On the basis of said dataset, the movement of the robotic device may be controlled.

Further advantages and a preferred embodiment will be described in the following together with the drawings listed below. The expressions "left", "right", "below" and "above" are referred to the drawings in an alignment such that the reference numbers used can be read in normal.

DETAILED DESCRIPTION OF THE INVENTION

Figure 1:
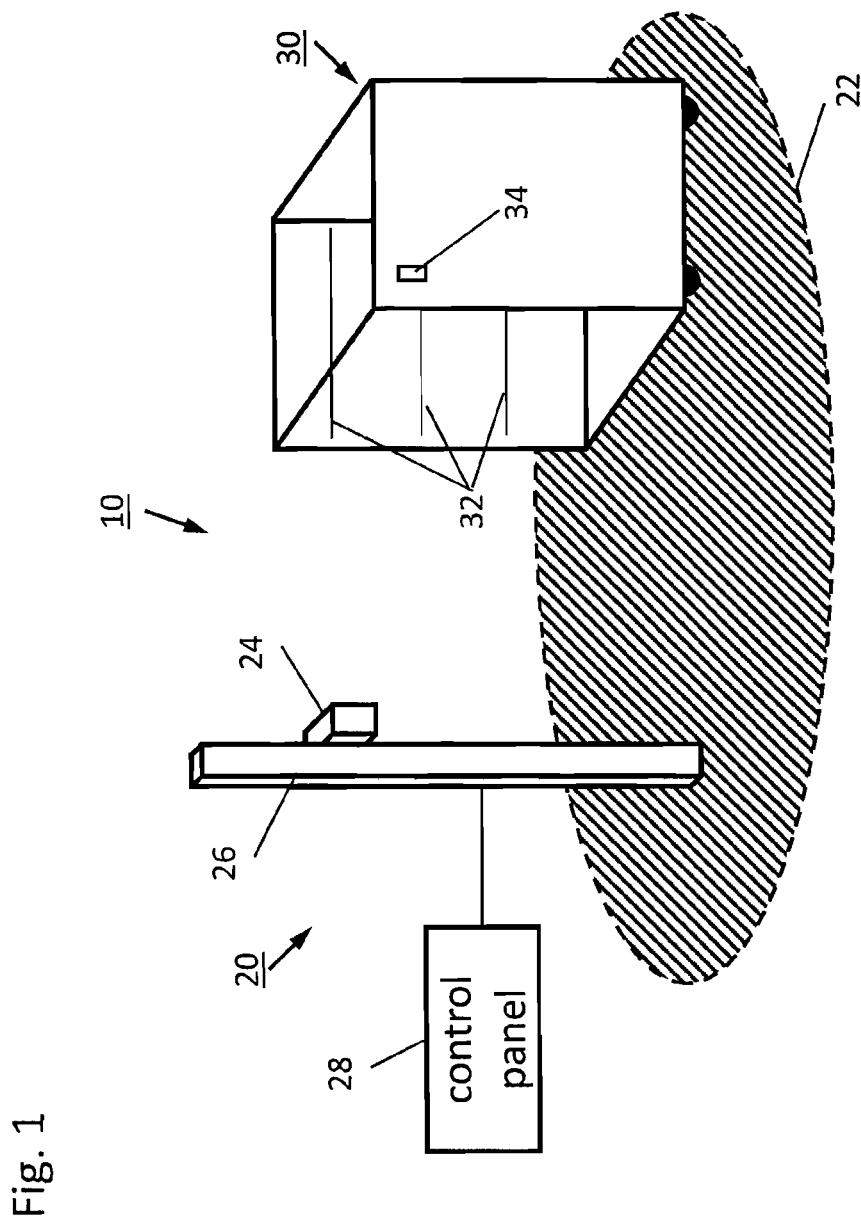
FIG. 1: is a schematically view of an exemplarily system for executing the measuring method according to the present invention.

The exemplarily system 10 for measuring a storage frame 30, according to FIG. 1, comprises as main a component a measuring apparatus 20 placed in a fixed position in an operating range 22 which is illustrated by broken lined circle 22. Measuring apparatus 20 includes at least one scanning device or scanner 24 vertically arranged at a carrier or bar 26. Scanner 24 may be a laser device. Bar 26 includes a not shown moving mechanism for vertically moving scanner 24 in a direction parallel along bar 26. Moreover, measuring apparatus 20 further comprises a control panel 28 for controlling measuring apparatus 20 and receiving data scanned by the scanner 24.

As it can further be seen from FIG. 1, a storage frame 30 is positioned in operating range 22 measuring apparatus 20. Inside storage frame 30, tray rails or shelf rails 32 e.g. in the form of horizontally aligned bars are arranged defining a horizontal storage plane and being used for positioning not shown smoking rods thereon. The smoking rods are used for storing products, like sausages, each having a sausage-shaped body and a loop for a pendulously storage of the products on the smoking rod.

A label 34 is attached at an outside surface of storage frame 30. The label 34 can be a human and/or machine readable label as well as a read- and/or writable label, like a RFID label. In the following, if the machine readable label is mentioned, it is indeed referred to a readable/writable label. Label 34 contains data regarding storage frame 30, like size of frame 30 vertical height or distance of tray rails 32 and/or maximum number of smoking rods storable in storage frame 30 according to kind and size of sausage products S.

Figure 2:
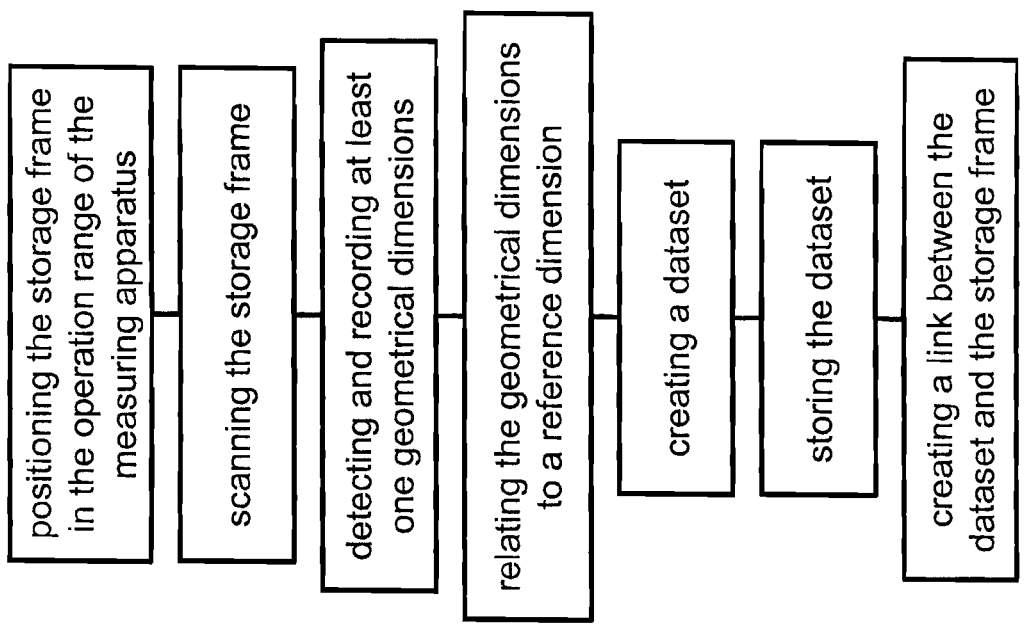
FIG. 2: is a schematically diagram of the method for measuring a storage frame according to the present invention.

In FIG. 2, a schematically diagram or flow chart of one embodiment of the method according to the present invention is shown. Based on this flowchart, one embodiment of the inventive method for measuring a storage frame 30 will now be described.

In a first step, the storage frame 30 to be measured is positioned in the operation range 22 of measuring apparatus 20. That means that the empty storage frame 30 is moved into the operating range 22 of measuring apparatus 20 and placed at a predetermined position. In the embodiment of the present invention, storage frame 30 is positioned to face scanner 24 with its open side to allow the scanner 24 to sense at least trays 32 of storage frame 30.

In the second step, storage frame 30 is scanned by scanner 24. In this step, according to the embodiment of FIG. 1, scanner 24 is moved in vertical direction along bar 26 while scanning storage frame 30.

After having scanned storage frame 30, predetermined geometrical dimensions are detected and recorded. In a simple design of the inventive method, only data regarding the length and the height of trays 32 are detected and recorded to minimize the data volume. Moreover, to save time, it is also possible to detect and record geometrical dimensions while scanning storage frame 30.

In the next step, the detected and recorded geometrical dimensions are related to a reference dimension. That means, that e.g. the height of trays 32 are related to a base level or zero level, to which the robotic device is related, too.

In the present case, at least the height of trays 32 is measured. Thus, the reference dimension is a reference height, too. The base level or zero level, to which the height of trays 32 is related, may be the bottom level of the measuring apparatus 20. It is also possible to relate the height of trays 32 to any other fixed reference point. To avoid a transformation of the scanned data, the reference height to which the height of trays 32 is related, should be the same reference height or reference level as used for controlling the movement of the robotic device. Other references may be used for relating the scanned data, e.g. a reference point to which the distance and the angle is measured.

Based on the geometrical dimensions related to a reference dimension, a dataset is created, including the necessary geometrical dimensions and the respective reference dimension. The dataset may also be generated to include geometric dimensions of storage frame 30 in the form of coordinates, which are related to a coordinate origin. In this case, it has to be understood, that the coordinate system used for generating the dataset is identical to the coordinate system used in the control system of the robotic device which is controlled on the basis of the dataset while handling the respective storage frame 30.

After a dataset is created, said dataset is stored in an appropriate storage medium or memory. In the embodiment according to FIG. 1, the memory is included in label 34, which is attached to storage frame 30. Other places for storing the dataset are possible, e.g. a memory inside control panel 28 or inside the control unit of the robotic device. In the case that the datasets are stored in control panel 28, the datasets have to be transmitted to the control unit of the robotic device for controlling the movement of to robotic device on the basis of the respective dataset. On the other hand, the datasets may be transmitted to the control unit of the robotic device immediately after said datasets have been created.

According to the inventive method, a link is created between the dataset and the respective storage frame 30. This link clearly identifies the dataset, which belongs to the storage frame actually to be handled by the robotic device. In the embodiment according to FIG. 1, the dataset is stored in the memory of label 34, which may be a machine readable label, including e.g. an RFID-chip. While handling the storage frame 30, the dataset is read out from label 34 and transferred to the control unit of the robotic device.

Other kinds of labels and links are possible. In a very simple case, storage frame 30 is provided with an identification number or sign. While providing the robotic device with the storage frame 30, said number or sign may be entered into the control unit of the robotic device and the respective dataset stored in said control unit and addressed by said number or sign is called.

Scanner 20, described as a laser scanner, may also be a camera. Moreover, scanner 20 may also include more than one laser device or camera. A second or third scanning device may be provided for scanning storage frame 30 from various directions to improve the accuracy of the scanned data and thereby the controlling of the robotic device. The step of scanning storage frame 30 may automatically carried out when storage frame 30 is provided in a predetermined position. But, also a manually actuated scanning is possible, for checking the correct position of storage frame 30 and/or for scanning only selected regions of storage frame 30, e.g. the region of trays 32.

As described above, in the step of detecting and recording geometrical dimensions, it is possible to detect all scanned dimensions. To minimize the data volume, only predetermined dimensions may be detected. Said predetermined dimensions may be manually selected by a user while scanning storage frame 30 or after storage frame 30 has been completely scanned. It is also possible to automatically select geometrical dimensions. In this case, markers are positioned at predetermined elements of storage frame 30 to be detected, e.g. at the ends of trays 32 and/or at the outer edges or corners of storage frame 30.

To create a link between storage frame 30 and the respective dataset, a label 34 or a number or sign may be used. In the case of a large number of storage frames 30 having the same geometrical dimensions, a label or number is not necessary. Such a storage frame 30 may have no special identification. While providing a storage frame 30 having no identification, a dataset for said large number of "equal" storage frames 30 may be called.

The invention claimed is:

1. A method for measuring a storage frame by a measuring apparatus having a scanning device and an operating range, the storage frame has at least one tray defining an at least one approximately horizontal storing plane and being configured for storing rod-like elements, the rod-like elements configured for storing products, each having a body and a loop for storage of the products on the rod-like element, the method comprising the steps of:
moving the storage frame into the operating range of the measuring apparatus,
scanning the storage frame by the measuring apparatus for detecting and recording data regarding geometrical dimensions of the storage frame including at least a height of the tray,
referring the height of the tray to a reference height,
creating a dataset including at least the height of the tray,
storing the dataset in a data memory device,
creating a link between the dataset and the storage frame,
providing classes of datasets and arranging the datasets which include at least the height of the tray in said classes, and
wherein each class of datasets includes datasets having similar features, and
transmitting the datasets to a system for handling the storage frames, which includes a robotic device, for controlling the movement of the robotic device on the basis of the respective dataset, while inserting or removing rod-like elements into or from the storage frame.

2. The method according to claim 1 further comprising the step of, detecting and recording further outer dimensions of the storage frame.

3. The method according to claim 2, wherein the coordinates comprise Cartesian, polar, or spherical coordinates.

4. The method according to claim 1, wherein said data includes coordinates.

5. The method according to claim 1, wherein the measuring apparatus is a camera.

6. The method according to claim 1, wherein the measuring apparatus is a laser device.

7. The method according to claim 1, wherein the measuring apparatus includes more than one measuring device.

8. The method according to claim 1, wherein the storage frame is provided with markers which mark the dimensions of the storage frame to be included in the dataset, and which are detected and recorded by the measuring apparatus.

9. The method according to claim 1 further comprising the step of, automatically detecting and recording at least one dimension of the storage frame and manually selecting the dimensions to be included in the dataset.

10. The method according to claim 9 further comprising the step of, reclassifying a dataset after remeasuring the storage frame.

11. The method according to claim 1, wherein each class of datasets includes datasets having similar geometrical dimensions.

* * * * *